United States Patent
Rogunova et al.

(10) Patent No.: US 10,308,805 B2
(45) Date of Patent: Jun. 4, 2019

(54) THERMOPLASTIC COMPOSITIONS HAVING LOW GLOSS AND HIGH IMPACT STRENGTH

(71) Applicant: Covestro LLC, Pittsburgh, PA (US)

(72) Inventors: Marina Rogunova, Pittsburgh, PA (US); James P. Mason, Carnegie, PA (US)

(73) Assignee: COVESTRO LLC, Pittsburgh, PA (US)

( * ) Notice: Subject to any disclaimer, the term of this patent is extended or adjusted under 35 U.S.C. 154(b) by 0 days.

(21) Appl. No.: 15/553,690

(22) PCT Filed: Dec. 9, 2015

(86) PCT No.: PCT/US2015/064747
§ 371 (c)(1),
(2) Date: Aug. 25, 2017

(87) PCT Pub. No.: WO2017/099754
PCT Pub. Date: Jun. 15, 2017

(65) Prior Publication Data
US 2018/0273747 A1    Sep. 27, 2018

(51) Int. Cl.
*C08L 69/00* (2006.01)
*C08L 67/02* (2006.01)

(52) U.S. Cl.
CPC .............. *C08L 69/00* (2013.01); *C08L 67/02* (2013.01); *C08L 2205/025* (2013.01); *C08L 2205/03* (2013.01); *C08L 2205/035* (2013.01); *C08L 2205/05* (2013.01); *C08L 2207/53* (2013.01)

(58) Field of Classification Search
CPC ........... C08L 2205/025; C08L 2205/05; C08L 2207/53
See application file for complete search history.

(56) References Cited

U.S. PATENT DOCUMENTS

| | | |
|---|---|---|
| 2,891,920 A | 6/1959 | Hyde et al. |
| 3,030,331 A | 4/1962 | Goldberg |
| 3,169,121 A | 2/1965 | Goldberg |
| 3,294,725 A | 12/1966 | Findlay et al. |
| 3,395,119 A | 7/1968 | Blaschke et al. |
| 3,419,634 A | 12/1968 | Vaughn |
| 3,533,167 A | 10/1970 | Schnell et al. |
| 3,729,447 A | 4/1973 | Haberland et al. |
| 4,075,173 A | 2/1978 | Maruyama et al. |
| 4,156,069 A | 5/1979 | Prevorsek et al. |
| 4,255,556 A | 3/1981 | Segal et al. |
| 4,260,731 A | 4/1981 | Mori et al. |
| 4,269,964 A | 5/1981 | Freitag et al. |
| 4,311,823 A | 1/1982 | Imai et al. |
| 4,334,053 A | 6/1982 | Freitag et al. |
| 4,369,303 A | 1/1983 | Mori et al. |
| 4,584,360 A | 4/1986 | Paul et al. |
| 4,714,746 A | 12/1987 | Serini et al. |
| 4,877,831 A | 10/1989 | Hongo et al. |
| 4,888,388 A | 12/1989 | Hongo et al. |
| 5,461,120 A | 10/1995 | Mason et al. |
| 5,556,908 A | 9/1996 | Chung et al. |
| 5,672,645 A | 9/1997 | Eckel et al. |
| 5,681,905 A | 10/1997 | Mason et al. |
| 5,693,697 A | 12/1997 | Weider et al. |
| 5,709,941 A | 1/1998 | Mason |
| 5,726,236 A | 3/1998 | Mason et al. |
| 5,807,914 A | 9/1998 | Obayashi et al. |
| 5,821,321 A | 10/1998 | Archey et al. |
| 5,981,661 A | 11/1999 | Liao et al. |
| 7,976,975 B2 | 7/2011 | Ajiki |
| 7,977,415 B2 | 7/2011 | Rogunova |
| 8,106,109 B2 | 1/2012 | Böhner et al. |
| 8,178,603 B2 | 5/2012 | Eckel et al. |
| 8,642,700 B2 | 2/2014 | Rogunova et al. |
| 8,658,420 B2 | 2/2014 | Gomy et al. |
| 8,748,521 B2 | 6/2014 | Taschner et al. |
| 8,779,033 B2 | 7/2014 | Seidel et al. |
| 9,145,490 B2 | 9/2015 | Chung et al. |
| 9,193,860 B2 | 11/2015 | Rogunova et al. |
| 9,570,211 B2 | 2/2017 | Li et al. |
| 2007/0054982 A1 | 3/2007 | Banerjie et al. |
| 2007/0123634 A1 | 5/2007 | Chung et al. |
| 2008/0132617 A1 | 6/2008 | Eckel et al. |
| 2008/0214729 A1 | 9/2008 | Rogunova et al. |
| 2009/0043038 A1 | 2/2009 | Rogunova et al. |
| 2009/0326111 A1 | 12/2009 | Rogunova |
| 2010/0317801 A1* | 12/2010 | Hirasawa ................ C08L 67/04 525/190 |
| 2013/0131257 A1* | 5/2013 | Sharma ................... C08L 67/02 524/539 |
| 2016/0032114 A1 | 2/2016 | Hager et al. |

FOREIGN PATENT DOCUMENTS

| | | |
|---|---|---|
| CA | 1173998 | 9/1984 |
| DE | 2232877 A1 | 1/1974 |
| DE | 3832396 A1 | 2/1990 |
| EP | 0363608 A1 | 4/1990 |
| EP | 0430134 A2 | 6/1991 |
| EP | 0752448 A2 | 1/1997 |
| GB | 1552558 | 9/1979 |
| GB | 2070167 A | 9/1981 |
| WO | 2005071012 A1 | 8/2005 |

OTHER PUBLICATIONS

W. Scholtan, H. Lange, Kolloid-Z. und Z. Polymere 250 (1972), pp. 782-796.

(Continued)

*Primary Examiner* — Mark S Kaucher
(74) *Attorney, Agent, or Firm* — Richard P. Bender

(57) ABSTRACT

Thermoplastic compositions are disclosed comprising a thermoplastic resin, a first impact modifier characterized by core-shell morphology and comprising a functional shell polymer, and a second impact modifier comprising a component capable of reaction with a functional shell polymer. In addition, thermoplastic compositions are also disclosed that comprise a thermoplastic resin and a loose agglomerations of particles that have open spaces, at least 50% of the loose agglomerations comprise open spaces that measure 31 to 60% by area of the loose agglomeration, and particles that are characterized by core-shell morphology. The inventive compositions demonstrate low gloss, high impact strength, good weatherability, and good flow properties.

20 Claims, No Drawings

(56) References Cited

OTHER PUBLICATIONS

H. Schnell, Chemistry and Physics of Polycarbonates, 1964, John Wiley & Sons, Inc., pp. 28-102.
Ullmanns Encyklopadie der technischen Chemie, vol. 18, p. 301 ff, 1979.
Geog Theime Verlag, Stuttgart, New York, Houben-Weyl, Methods of Organic Chemistry, 4th Edition, vol. 12/1, (1990), pp. 34-63.
Beilsteins Handbuch Der Organischen Chemie, Jan., 1910, vol. 6, p. 177.

\* cited by examiner

THERMOPLASTIC COMPOSITIONS HAVING LOW GLOSS AND HIGH IMPACT STRENGTH

CROSS-REFERENCE TO RELATED APPLICATION

This application is a national stage application under 35 U.S.C. § 371 of PCT/US2015/64747, filed Dec. 9, 2015 which this application claims the benefit of and which is incorporated by reference herein.

FIELD OF THE INVENTION

The present invention relates in general to thermoplastic compositions, and more specifically to thermoplastic compositions having low gloss and high impact strength.

BACKGROUND OF THE INVENTION

Thermoplastic compositions are used in automotive applications, and may replace painted parts, as a color may be added to the thermoplastic resin obviating any need to provide an exterior coat of paint. Automotive interior designs must feature improved component functionality without sacrificing an elegant, luxurious appearance. Automotive original equipment manufacturers (OEMs) prefer low-gloss materials for interior applications that can stand up to years of wear and tear and environmental exposure. However, many thermoplastic compositions have a high gloss, and injection molding of polycarbonate blends produces a glossy appearance requiring surface finishes or paints to deliver low gloss surfaces.

Furthermore, many thermoplastic compositions become brittle at low temperatures, which limit their use in automotive applications where a vehicle is expected to endure both cold and hot temperatures. Finally, thermoplastic compositions often do not create a molded product that is weatherable, and after a few seasons of UV/temperature/humidity exposures, cracks appear on the surface. Such negative effects of thermoplastics have prevented their adoption by automotive OEMs. Furthermore, any use of a thermoplastic resin would require it to have good flow properties to allow it to be molded into an automotive part.

Thus, a need exists for thermoplastic compositions that have improved low temperature ductility, weatherability and flow properties, while still creating a molded article with low gloss that may be used in automotive applications.

SUMMARY OF THE INVENTION

In one embodiment, a thermoplastic composition comprises A) a thermoplastic resin; B) an impact modifier capable of reaction with a functional shell polymer, that does not comprise a functional shell polymer; and C) an impact modifier characterized by core-shell morphology and comprising a functional shell polymer.

In another embodiment, a thermoplastic composition comprises a thermoplastic resin; and loose agglomerations of particles, wherein the loose agglomerations comprise open spaces, at least 50% of the loose agglomerations comprise open spaces that measure 31 to 60% by area of the loose agglomeration, and wherein the loose agglomerations of particles comprise particles characterized by core-shell morphology.

In yet another embodiment, the thermoplastic resin comprises a polyester selected from the group consisting of polycarbonate, polyethylene terephthalate and polybutylene terephthalate.

In still another embodiment, the thermoplastic resin comprises about 40 to about 90 wt. % of the composition, preferably about 60 to about 80 wt. %, most preferably about 65 to about 75 wt. %.

In an embodiment not yet disclosed, the loose agglomerations comprise Component B: an impact modifier and Component C: a second impact modifier.

In another embodiment, Component B is characterized by core-shell morphology. In a different embodiment, Component B may comprise a siloxane. In still another embodiment, Component B may comprise a graft base that comprises 10 to 70 wt. %, particularly preferably from 20 to 60 wt. %, silicone rubber. In yet another embodiment, Component B comprises acrylic. In still another embodiment not yet disclosed, Component B comprises an impact modifier capable of reaction with epoxy functionality, that does not comprise epoxy functionality.

In a different embodiment, Component B or Component C comprises a core that does not include carbon-carbon double-bonds. In another different embodiment, Component B or Component C comprises acrylate, preferably methyl methacrylate.

In still another embodiment, the functional shell polymer of Component C is epoxy functionality, and the epoxy functionality of Component C may be glycidyl (meth) acrylate.

In another embodiment not yet disclosed, Component B or Component C has a glass transition temperature of −40° C. or less, preferably −50° C. or less.

In a different embodiment, Component B or Component C comprises about 60 to about 95 wt. % core, preferably about 70 to about 80 wt. % core, as a percentage of the total weight of the impact modifier's core and shell.

In yet another embodiment, Component B is present in the composition in an amount of about 5 to about 20 wt. %, preferably about 7.5 to about 15 wt. %, while or alternatively, Component C may be present in the composition in an amount of about 1 to about 10 wt. %, preferably 2 to about 7.5 wt. %.

In a new embodiment, the thermoplastic composition further comprises Component D: a vinyl (co)polymer. In this embodiment, the vinyl (co)polymer may or may not be styrene acrylonitrile. In addition, Component D may comprise about 5 to about 20 wt. % of the thermoplastic composition.

In still another embodiment, the thermoplastic composition further comprises Component E: at least one additive selected from group consisting of: flame retardants, flame retarding synergists, anti-dripping agents, antioxidants, UV absorbers, light absorbers, fillers, reinforcing agents, additional impact modifiers, lubricants, plasticizers, optical brighteners, pigments, dyes, colorants, anti-static agents, mold-release agents, blowing agents, and combinations of any thereof. In this embodiment, Component E may comprise about 0.02 to about 1.64 wt. % of the thermoplastic composition.

In another embodiment, Component B and Component C form loose agglomerations of particles, at least 50% of the loose agglomerations comprise open spaces that measure 31 to 60% by area of the loose agglomeration. In a different embodiment, the loose agglomerations comprise particles having a diameter between 0.4 and 4.0 microns.

In still another embodiment not yet disclosed, a molded part may comprise the thermoplastic composition of any of the above embodiments. In another embodiment, a molded part may comprise a thermoplastic resin and loose agglomerations of particles, at least 50% of the loose agglomerations comprise open spaces that measure 31 to 60% by area of the loose agglomeration. In yet another embodiment, there is a process for producing a molded part comprising the thermoplastic composition disclosed above, the process comprising at least one of an injection molding, an extrusion and a blow molding process.

DETAILED DESCRIPTION OF THE INVENTION

The present invention will now be described for purposes of illustration and not limitation. Reference throughout this specification to "various non-limiting embodiments," "certain embodiments," or the like, means that a particular feature or characteristic may be included in an embodiment. Thus, use of the phrase "in various non-limiting embodiments," "in certain embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various or certain embodiments may be combined, in whole or in part, with the features or characteristics of one or more other embodiments without limitation. Such modifications and variations are intended to be included within the scope of the present specification.

Various non-limiting embodiments disclosed and described in this specification are directed, in part, to thermoplastic compositions comprising a thermoplastic resin, a first impact modifier and a second impact modifier. In another embodiment of the present invention, the thermoplastic composition comprises a thermoplastic resin and loose agglomerations of particles comprising a first impact modifier and a second impact modifier. The thermoplastic compositions of the present invention may further include a flow modifier, and also additives such as antioxidants, UV absorbers, light absorbers, fillers, reinforcing agents, additional impact modifiers, lubricants, plasticizers, optical brighteners, pigments, dyes, colorants, flame-retarding agents, anti-static agents, mold-release agents, blowing agents, and combinations of any thereof.

Component A

Component A is a thermoplastic resin, which preferably comprises a polyester, such as polycarbonate, polyethylene terephthalate, polybutylene terephthalate, or a blend of one or more polyester resins. In a preferred embodiment, the thermoplastic resin comprises polycarbonate.

Aromatic polycarbonates and/or aromatic polyester carbonates according to component A that are suitable according to the invention are known in the literature or can be prepared by processes known in the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the preparation of aromatic polyester carbonates see e.g. DE-A 3 077 934).

The preparation of aromatic polycarbonates can be carried out, for example, by reaction of diphenols with carbonic acid halides, preferably phosgene, and/or with aromatic dicarboxylic acid dihalides, preferably benzenedicarboxylic acid dihalides, according to the interfacial process, optionally using chain terminators, for example monophenols, and optionally using branching agents having a functionality of three or more than three, for example triphenols or tetraphenols. Preparation by a melt polymerisation process by reaction of diphenols with, for example, diphenyl carbonate is also possible.

Diphenols for the preparation of the aromatic polycarbonates and/or aromatic polyester carbonates include preferably those of formula (I)

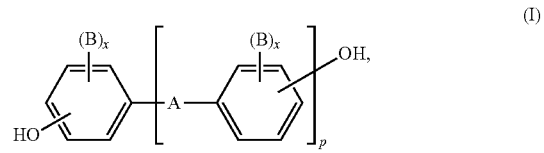

wherein
A is a single bond, $C_1$- to $C_5$-alkylene, $C_2$- to $C_5$-alkylidene, $C_5$- to $C_6$-cycloalkylidene, —O—, SO—, —CO—, —S—, —SO_2—, $C_6$- to $C_{12}$-arylene, to which further aromatic rings optionally containing heteroatoms can be fused,
or a radical of formula (II) or (Ill)

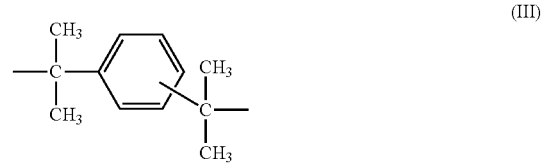

B is in each case C1- to C12-alkyl, preferably methyl, halogen, preferably chlorine and/or bromine,
x each independently of the other is 0, 1 or 2,
p is 1 or 0, and
$R^5$ and $R^6$ can be chosen individually for each $X^1$ and each independently of the other is hydrogen or $C_1$- to $C_6$-alkyl, preferably hydrogen, methyl or ethyl,
$X^1$ is carbon and
m is an integer from 4 to 7, preferably 4 or 5, with the proviso that on at least one atom $X^1$, $R^5$ and $R^6$ are simultaneously alkyl.

Preferred diphenols include hydroquinone, resorcinol, dihydroxydiphenols, bis-(hydroxyphenyl)-C1 C5-alkanes, bis-(hydroxyphenyl)-C5-C6-cycloalkanes, bis-(hydroxyphenyl) ethers, bis-(hydroxyphenyl) sulfoxides, bis-(hydroxyphenyl) ketones, bis-(hydroxyphenyl)-sulfones and α,α-bis-(hydroxyphenyl)-diisopropyl-benzenes, and derivatives thereof brominated and/or chlorinated on the ring.

Particularly preferred diphenols include 4,4'-dihydroxydiphenyl, bisphenol A, 2,4-bis(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenylsulfone and di- and tetra-brominated or chlorinated derivatives thereof such as, for example, 2,2-bis-(3-chloro-4-hydroxyphenyl)-propane, 2,2-bis-(3,5-dichloro-4-hydroxyphenyl)- propane or 2,2-bis-(3,5-dibromo-4-hydroxyphenyl)-propane, 2,2-Bis-(4-hydroxyphenyl)-propane (bisphenol A) is particularly preferred.

The diphenols can be used on their own and/or in the form of arbitrary mixtures. The diphenols are known in the literature or are obtainable according to processes known to one of skill in art in the literature.

Chain terminators suitable for the preparation of thermoplastic aromatic polycarbonates include, for example, phenol, p-chlorophenol, p-tert-butylphenol or 2,4,6-tribromophenol, but also long-chained alkylphenols, such as 4-[2-(2,4,4-trimethylpentyl)]-phenol, 4-(1,3-tetramethyl-butyl)-phenol according to DE-A 2 842 005 or monoalkylphenol or dialkylphenols having a total of from 8 to 20 carbon atoms in the alkyl substituents, such as 3,5-di-tert-butyl-phenol, p-isooctylphenol, p-tert-octylphenol, p-dodecyl-phenol and 2-(3,5-dimethyl-heptyl)-phenol and 4-(3,5-dimethylheptyl)-phenol. The amount of chain terminators to be used is generally from 0.5 mol % to 10 mol %, based on the molar sum of the diphenols used in a particular case.

The thermoplastic aromatic polycarbonates can be branched in a known manner, preferably by the incorporation of from 0.05 to 2.0 mol %, based on the sum of the diphenols used, of compounds advantageously having a functionality of three or more than three, for example those having three or more phenolic groups.

Both homopolycarbonates and copolycarbonates are suitable. For the preparation of copolycarbonates of component A according to the present invention, it is also possible to use from 1 to 25 wt. %, preferably from 2.5 to 25 wt. %, based on the total amount of diphenols to be used, of polydiorganosiloxanes having hydroxyaryloxy end groups. These are known (U.S. Pat. No. 3,419,634) and can be prepared according to processes known in the literature. The preparation of copolycarbonates containing polydiorganosiloxanes is described in DE-A 3 334 782.

Preferred polycarbonates in addition to the bisphenol A homopolycarbonates include the copolycarbonates of bisphenol A, advantageously with up to 15 mol %, based on the molar sums of diphenols, of diphenols other than those mentioned as being preferred or particularly preferred, in particular 2,2-bis(3,5-dibromo-4-hydroxyphenyl)-propane.

Aromatic dicarboxylic acid dihalides for the preparation of aromatic polyester carbonates can preferably be diacid dichlorides of isophthalic acid, terephthalic acid, diphenyl ether 4,4'-dicarboxylic acid and naphthalene-2,6-dicarboxylic acid.

Mixtures of the diacid dichlorides of isophthalic acid and terephthalic acid in a ratio of from 1:20 to 20:1 are particularly preferred.

In the preparation of polyester carbonates, a carbonic acid halide, preferably phosgene, is additionally used concomitantly as a bifunctional acid derivative.

Suitable chain terminators for the preparation of the aromatic polyester carbonates, in addition to the monophenols already mentioned, also include chlorocarbonic acid esters thereof and the acid chlorides of aromatic monocarboxylic acids, which can optionally be substituted by $C_1$- to $C_{22}$-alkyl groups or by halogen atoms, as well as aliphatic $C_2$- to $C_{22}$-monocarboxylic acid chlorides.

The amount of chain terminators is advantageously in each case from 0.1 to 10 mol %, based in the case of phenolic chain terminators on moles of diphenol and in the case of monocarboxylic acid chloride chain terminators on moles of dicarboxylic acid dichloride.

The aromatic polyester carbonates can also optionally contain aromatic hydroxycarboxylic acids incorporated therein.

The aromatic polyester carbonates can be both linear and/or branched in any known manner (see in this connection DE-A 2 940 024 and DE-A 3 007 934).

There can optionally be used as branching agents, for example, carboxylic acid chlorides having a functionality of three or more, such as trimesic acid trichloride, cyanuric acid trichloride, 3,3',4,4'-benzophenone-tetracarboxylic acid tetrachloride, 1,4,5,8-naphthalene-tetracarboxylic acid tetrachloride or pyromellitic acid tetrachloride, in amounts of from 0.01 to 1.0 mol % (based on dicarboxylic acid dichlorides used), or phenols having a functionality of three or more, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxy-phenyl)-ethane, tri-(4-hydroxyphenyl)-phenylmethane, 2,2-bis[4,4-bis(4-hydroxyphenyl)-cyclo-hexyl]-propane, 2,4-bis(4-hydroxyphenyl-isopropyl)-phenol, tetra-(4-hydroxy-phenyl)-methane, 2,6-bis(2-hydroxy-5-methyl-benzyl)-4-methyl-phenol, 2-(4-hydroxyphenyl)-2-(2,4-dihydroxyphenyl)-propane, tetra-(4-[4-hydroxy-phenyl-isopropyl]-phenoxy)-methane, 1,4-bis [4,4'-dihydroxytriphenyl)-methyl]-benzene, in amounts of from 0.01 to 1.0 mol %, based on diphenols used. Phenolic branching agents can be placed in a vessel with the diphenols; acid chloride branching agents can be introduced together with the acid dichlorides if desired for any reason.

The content of carbonate structural units in the thermoplastic aromatic polyester carbonates can vary as desired. The content of carbonate groups is preferably up to 100 mol %, in particular up to 80 mol %, particularly preferably up to 50 mol %, based on the sum of ester groups and carbonate groups. Both the esters and the carbonates contained in the aromatic polyester carbonates can be present in the polycondensation product in the form of blocks and/or distributed randomly.

In a preferred embodiment of the present invention, the aromatic polycarbonates and aromatic polyester carbonates advantageously have a weight-average molecular weight (Mw, measured, for example, by GPC, based on polystyrene standards using a Universal Calibration Method reporting polycarbonate numbers. A Waters Alliance Gel Permeation Chromatograph is used to perform the separation. The data analysis is done using EmpowerPro3 software. The chromatographic conditions are: temperature: 35 C in columns & detector; solvent is tetrahydrofuran (THF); flow rate is 1.0 ml/min.; flow standard is toluene; injection volume is 75 µl; operating pressure is 760 psi; sample concentration is 0.5%) of from 22,000 to 32,000 g/mol, particularly preferably from 24,000 to 28,000 g/mol.

The thermoplastic aromatic polycarbonates and polyester carbonates can be used on their own and/or in an arbitrary mixture.

In various non-limiting embodiments, commercially-available polycarbonate resins may be used in polycarbonate compositions. Non-limiting examples of suitable polycarbonate resins include, for example, the bisphenol-based polycarbonate resins available from Covestro under the MAKROLON trade name. Additional polycarbonate resins that may be used in various non-limiting embodiments are described, for example, in U.S. Pat. Nos. 3,030,331; 3,169,121; 3,395,119; 3,729,447; 4,255,556; 4,260,731; 4,369,303; 4,714,746; 5,693,697, which are all incorporated by reference herein, and in U.S. Patent Application Publication Nos. 2007/0123634; 2008/0132617; 2010/0160508; and 2011/0003918, which are also incorporated by reference herein.

Component A may comprise about 40.0 wt. % to about 90.0 wt. % of the thermoplastic composition, preferably about 60.0 wt. % to about 80.0 wt. % of the composition, most preferably, about 65.0 wt. % to about 75.0 wt. %, wherein the wt. %, all instances, is based on total composition weight.

Component B

Component B is an impact modifier, characterized by graft copolymer B. Graft copolymer B can generally be prepared by radical polymerization, for example by emulsion, suspension, solution or mass polymerization, preferably by emulsion polymerization. Component B comprises monomer B.1 and optionally graft base B.2.

Suitable monomers B.1 include vinyl monomers such as vinyl aromatic compounds and/or vinyl aromatic compounds substituted on the ring (such as styrene, α-methyl-styrene, p-methylstyrene, p-chlorostyrene), methacrylic acid ($C_1$-$C_8$)-alkyl esters (such as methyl methacrylate, ethyl methacrylate, 2-ethylhexyl methacrylate, allyl methacrylate), acrylic acid ($C_1$-$C_8$)-alkyl esters (such as methyl acrylate, ethyl acrylate, n-butyl acrylate, tert-butyl acrylate), organic acids (such as acrylic acid, methacrylic acid) and/or vinyl cyanides (such as acrylonitrile and methacrylonitrile) and/or derivatives (such as anhydrides and imides) of unsaturated carboxylic acids (for example maleic anhydride and N-phenylmaleimide). These vinyl monomers can be used on their own or in mixtures of at least two monomers.

Preferred monomers B.1 can be selected from at least one of the monomers styrene, methyl methacrylate, n-butyl acrylate and acrylonitrile. Particular preference is given to the use of methyl methacrylate or a mixture of styrene and acrylonitrile as the monomer B.1.

Component B may optionally include graft base B.2. The glass transition temperature of the graft base B.2 is typically <10° C., preferably <0° C., particularly preferably <−20° C. The graft base B.2 generally has a mean particle size ($d_{50}$ value) of from 0.05 to 10 μm, preferably from 0.06 to 5 μm, particularly preferably from 0.1 to 1 μm.

The mean particle size ($d_{50}$ value) is the diameter above and below which in each case 50 wt. % of the particles lie. It can be determined by means of ultracentrifuge measurement (W. Scholtan, H. Lange, Kolloid-Z. und Z. Polymere 250 (1972), 782-796).

The graft base B.2 can comprise composite rubbers of silicone rubber and acrylate rubber, these two types of rubber being present, for example, in the form of a physical mixture or the silicone rubber and the acrylate rubber, for example, forming an interpenetrating network as a result of their preparation or, for example, the silicone rubber and the acrylate rubber forming a graft base that has a core-shell structure. Preferred graft bases B.2 include composite rubbers of from 10 to 70 wt. %, particularly preferably from 20 to 60 wt. %, silicone rubber and from 90 to 30 wt. %, particularly preferably from 80 to 40 wt. %, butyl acrylate rubber (the indicated wt. % is here based in each case on the graft base B.2). In comparison to "pure" acrylate rubber based impact modifiers, impact modifiers that include a silicon component offer the potential to further optimize low temperature ductility of the resulting blends. Notably, the glass transition temperature of the silicone rubber portion is significantly lower than that of acrylate rubbers. For example, the glass transition temperature for dimethylsiloxane rubber is −112° C., compared with −40 to −60° C. for acrylate rubbers.

The silicone-acrylate rubbers are preferably composite rubbers having at least one graft-active site. The silicone rubber and the acrylate rubber preferably interpenetrate in the composite rubber so that they cannot substantially be separated from one another.

Silicone-acrylate rubbers are known and described, for example, in U.S. Pat. No. 5,807,914, EP 430134 and U.S. Pat. No. 4,888,388.

Silicone rubber components of the silicone-acrylate rubber according to B.2 can preferably be prepared by emulsion polymerization, in which the siloxane monomer structural units, crosslinkers or branching agents (IV) and optionally grafting agents (V) can be used.

There can be used as the siloxane monomer structural units, for example and preferably, dimethylsiloxane or cyclic organosiloxanes having at least 3 ring members, preferably from 3 to 6 ring members, such as, for example and preferably, hexamethylcyclotrisiloxane, octamethyl-cyclotetrasiloxane, decamethylcyclopentasiloxane, dodecamethyl-cyclohexasiloxane, trimethyl-triphenyl-cyclotrisiloxane, tetramethyl-tetraphenyl-cyclotetrasiloxane, octaphenylcyclotetrasiloxane.

The organosiloxane monomers can be used on their own and/or in the form of mixtures of 2 or more monomers. The silicone rubber preferably contains not less than 50 wt. % and particularly preferably not less than 60 wt. % organosiloxane, based on the total weight of the silicone rubber component.

As crosslinkers or branching agents (IV) there can be preferably used silane-based crosslinkers having a functionality of 3 or 4, particularly preferably 4. Preferred examples which may be mentioned include: trimethoxymethylsilane, triethoxyphenylsilane, tetramethoxysilane, tetraethoxysilane, tetra-n-propoxysilane and tetrabutoxysilane. The crosslinker can be used on its own and/or in a mixture of two or more. Tetraethoxysilane is particularly preferred in some cases.

A crosslinker can be used, for example, in an amount in the range from 0.1 to 40 wt. %, based on the total weight of the silicone rubber component. The amount of crosslinker is preferably so chosen that the degree of swelling of the silicone rubber, measured in toluene, is from 3 to 30, preferably from 3 to 25 and particularly preferably from 3 to 15. The degree of swelling is defined as the weight ratio of the amount of toluene absorbed by the silicone rubber when it is saturated with toluene at 25° C. and the amount of silicone rubber in the dry state. The determination of the degree of swelling is described in detail in EP 249964, which is incorporated herein by reference.

Tetrafunctional branching agents are often preferred to trifunctional branching agents because the degree of swelling can then more easily be controlled within the above-described limits.

Suitable grafting agents (V) are compounds that are capable of forming structures of the following formulae:

$$CH_2=C(R^2)-COO-(CH_2)_p-SiR^1{}_nO_{(3-n)/2} \quad (V\text{-}1)$$

$$CH_2=CH-SiR^1{}_nO_{(3-n)/2} \quad (V\text{-}2) \text{ or}$$

$$HS-(CH_2)_p-SiR^1{}_nO_{(3-n)/2} \quad (V\text{-}3),$$

wherein
$R^1$ represents $C_1$-$C_4$-alkyl, preferably methyl, ethyl or propyl, or phenyl,
$R^2$ represents hydrogen or methyl,
n denotes 0, 1 or 2 and
p denotes an integer from 1 to 6.

Acryloyl- or methacryloyl-oxysilanes are particularly suitable for forming the above-mentioned structure (V-1) and have a high grafting efficiency. Effective formation of the graft chains is thereby often ensured, and the impact strength of the resulting resin composition is accordingly typically promoted. Preferred examples which may be mentioned include: β-methacryloyloxy-ethyldimethoxymethyl-silane, γ-methacryloyloxy-propyl-methoxydimethyl-silane, γ-methacryloyloxy-propyldimethoxy-methyl-silane, γ-methacryloyloxy-propyltrimethoxy-silane, γ-methacryloyloxy-propylethoxy-diethyl-silane, γ-methacryloyloxy-propyldiethoxymethyl-silane, δ-methacryloyl-oxy-butyldiethoxymethyl-silane or mixtures thereof.

Preferably from 0 to 20 wt. % of a suitable grafting agent, based on the total weight of the silicone rubber, is used.

The silicone rubber can be prepared by any method such as emulsion polymerization, as described, for example, in U.S. Pat. Nos. 2,891,920 and 3,294,725. The silicone rubber is thereby obtained in the form of an aqueous latex. To that end, a mixture containing organosiloxane, crosslinker and optionally grafting agent is mixed with water, with shearing, for example by means of a homogenizer, in the presence of an emulsifier based, in a preferred embodiment, on sulfonic acid, such as, for example, alkylbenzenesulfonic acid or alkylsulfonic acid, the mixture polymerizing completely to give the silicone rubber latex. An alkylbenzenesulfonic acid is particularly suitable because it acts not only as an emulsifier but also as a polymerization initiator. In this case, a combination of the sulfonic acid with a metal salt of an alkylbenzenesulfonic acid or with a metal salt of an alkyl-sulfonic acid is advantageous because the polymer is thereby stabilized during the subsequent graft polymerization.

After the polymerization, the reaction is ended by neutralizing the reaction mixture by adding an aqueous alkaline solution, for example by adding an aqueous sodium hydroxide, potassium hydroxide or sodium carbonate solution.

Suitable polyalkyl (meth)acrylate rubber components of the silicone-acrylate rubbers according to B.2 can be prepared, for example, from methacrylic acid alkyl esters and/or acrylic acid alkyl esters, a crosslinker (VI) and a grafting agent (VII). Examples of preferred methacrylic acid alkyl esters and/or acrylic acid alkyl esters include the $C_1$- to $C_8$-alkyl esters, for example methyl, ethyl, n-butyl, tert-butyl, n-propyl, n-hexyl, n-octyl, n-lauryl and 2-ethylhexyl esters; haloalkyl esters, preferably halo-$C_1$-$C_8$-alkyl esters, such as chloroethyl acrylate, and mixtures of these monomers. n-Butyl acrylate is particularly preferred.

Preferable rubber graft bases B.2 are ones without carbon-carbon double bonds, such as those present in -diene compounds, like ABS. Carbon-carbon double bonds are less stable than carbon-carbon single bonds, and can become unstable through exposure to sunlight. Thus, preferable graft bases B.2 do not contain carbon-carbon double bonds.

As crosslinkers (VI) for the polyalkyl (meth)acrylate rubber component of the silicone-acrylate rubber there can be used monomers having more than one polymerizable double bond. Preferred examples of crosslinking monomers include esters of unsaturated monocarboxylic acids having from 3 to 8 carbon atoms and unsaturated monohydric alcohols having from 3 to 12 carbon atoms, or saturated polyols having from 2 to 4 OH groups and from 2 to 20 carbon atoms, such as ethylene glycol dimethacrylate, propylene glycol dimethacrylate, 1,3-butylene glycol dimethacrylate and 1,4-butylene glycol dimethacrylate. The crosslinkers can be used on their own or in mixtures of at least two crosslinkers.

Examples of preferred grafting agents (VII) include allyl methacrylate, triallyl cyanurate, triallyl isocyanurate or mixtures thereof. Allyl methacrylate can also be used as crosslinker (VI). The grafting agents can be used on their own and/or in mixtures of at least two grafting agents.

The amount of crosslinker (VI) and grafting agent (VII) is advantageously from 0.1 to 20 wt. %, based on the total weight of the polyalkyl (meth)acrylate rubber component of the silicone-acrylate rubber.

The silicone-acrylate rubber can be prepared, for example, by first preparing the silicone rubber according to B.2.1 in the form of an aqueous latex. The latex is then enriched with the methacrylic acid alkyl esters and/or acrylic acid alkyl esters that are to be used, the crosslinker (VI) and the grafting agent (VII), and a polymerization is carried out. Preference is given to an emulsion polymerization initiated by radicals, for example by a peroxide, an azo or a redox initiator. Particular preference is given to the use of a redox initiator system, especially of a sulfoxylate initiator system prepared by combination of iron sulfate, disodium ethylene-diaminetetraacetate, rongalite and hydroperoxide.

The grafting agent (V) that is used in the preparation of the silicone rubber preferably has the effect of bonding the polyalkyl (meth)acrylate rubber component covalently to the silicone rubber component. In the polymerization, the two rubber components interpenetrate and thus form the composite rubber, which can no longer be separated into its constituents of silicone rubber component and polyalkyl (meth)acrylate rubber component after the polymerization.

For the preparation of the silicone-acrylate graft polymers B mentioned as component B, the monomers B.1 can be grafted on to the rubber base B.2.

The polymerization methods described, for example, in EP 249964, EP 430134 and U.S. Pat. No. 4,888,388 can be used thereby.

For example, the graft polymerization can advantageously be carried out according to the following polymerization method: In a single- or multi-stage emulsion polymerization initiated by radicals, the desired vinyl monomers B.1 are polymerized on to the graft base, which is present in the form of an aqueous latex. The grafting efficiency should thereby be as high as possible and is preferably greater than or equal to 10%. The grafting efficiency is significantly dependent on the grafting agent (V) or (VII) that is used. After the polymerization to the silicone (acrylate) graft rubber, the aqueous latex is added to hot water, in which metal salts, such as, for example, calcium chloride or magnesium sulfate, have previously been dissolved. The silicone (acrylate) graft rubber thereby coagulates and can subsequently be separated.

In an embodiment where Component B comprises core-shell morphology, Component B comprises about 60 to about 95 wt. % core, preferably 70 to about 90 wt. % core B.2, with the remaining amount in Component B being the shell B.1. The glass transition temperature of Component B is preferably −40° C. or less, most preferably −50° C. or less.

Component B may be, but is not limited to, impact modifiers having a core-shell morphology as disclosed above. Preferably, Component B does not comprise a functional shell polymer. Component B may comprise about 5 wt. % to about 20 wt. % of the thermoplastic composition, preferably about 7.5 wt. % to about 15 wt. % of the composition, wherein the wt. %, all instances, is based on total composition weight.

Component C

Component C is also an impact modifier, and is also characterized by graft copolymer B hereinabove. However, component C differs from component B, in that it comprises core-shell morphology and a functional shell polymer in its shell corresponding to shell B.1 described above.

In addition to the monomers described in B.1 above, the shell of component C also includes a functional shell polymer. By "functional shell polymer", as used herein, means either a blend of functional and non-functional polymers, or at least one copolymer containing one or more different functional groups, either in the copolymer backbone, as pendant groups, or both. The functionalized copolymer may be formed in several different ways, as known in the art. These include copolymerization (random or block) of one or more functional monomers with non-functional monomers, grafting, and post-polymerization functionalization of a polymer, or a mixture thereof.

Non-functional ethylenically unsaturated monomers useful in forming the shell polymer include, but are not limited to, styrene, (meth)acrylonitrile, ethyl acrylate, propyl acrylate, butyl acrylate, methyl methacrylate, divinyl benzene, acrylonitrile, and mixtures thereof.

Functional monomers useful as comonomers to add functionality to the copolymer include, but are not limited to, those containing acid, anhydride, hydroxy, epoxy, and amine groups. Examples of useful functional comonomers include, but are not limited to: N,N-dimethylaminoethyl(meth)acrylate, N,N-diethylaminoethyl (meth)acrylate, (meth)acrylamide, N,N-dimethylacrylamide, N-methylolacrylamide, N-methylaminopropyl(meth)acrylamide, N,N-dimethylaminopropyl(meth)acrylamide, N-ethylamino propyl(meth) acrylamide, N,N-diethylaminopropyl (meth)acrylamide, N-methylacrylamide or N-t-butylacrylamide or N-ethyl (meth)acrylamide or chlorides of these compounds, 2-hydroxyethyl(meth)acrylate, hydroxypropyl(meth)acrylate, 4-hydroxybutyl (meth)acrylate, glycidyl(meth)acrylate, ethyl alpha-hydroxymethacrylate, and 2,3-dihydroxypropyl (meth)acrylate, maleic anhydride, maleic acid, substituted maleic anhydride, mono-ester of maleic anhydride, itaconic anhydride, itaconic acid, substituted itaconic anhydride, glutaric anhydride, monoester of itaconic acid, fumaric acid, fumaric anhydride, fumaric acid, substituted fumaric anhydride, monoester of fumaric acid, crotonic acid and its derivatives, acrylic acid, and methacrylic acid; cyanoalkoxyalkyl (meth)acrylates such as omega-cyanoethoxyethyl acrylate, or omega-cyanoethoxyethyl methacrylate; vinyl monomers containing an aromatic ring and an hydroxyl group, such as vinylphenol, para-vinylbenzyl alcohol, meta-vinylphenethyl alcohol, vinyl pyrrolidone, and vinyl imidazole; and other functional monomers, allyl cellosolve, allyl carbinol, methylvinyl carbinol, allyl alcohol, methyllyl alcohol, glycidyl methacrylate, 3,4-epoxybutyl acrylate, acrylonitrile, methacrylonitrile, beta-cyanoethyl methacrylate, beta-cyanoethyl acrylate, Examples of polymerizable surfactants or macromonomers with hydrophilic moieties useful in the present invention include, but are not limited to sodium 1-allyloxy-2-hydroxypropane sulfonate, phosphate methacrylate monomer, poly(ethylene glycol)methylether methacrylate, 1-methacrylamido, 2-imidazolidinone ethane. A preferred functionality of Component C is epoxy functionality.

Epoxy monomers, or resins, contain a reactive oxirane structure which is commonly referred to as an "epoxy functionality." The most popular epoxy monomers are those derived from the reaction of bis(4-hydroxy phenylene)-2,2 propane (called bisphenol A) and 1-chloroprene 2-oxide (called epichlorohydrin), in the presence of sodium hydroxide. The structure of the major product, bisphenol A diglycidyl ether (DGEBA or BADGE) and its condensed forms, is dependent upon the stoichiometry of the reactants. Typical monomers ("resins") are marketed with n values lying in the range 0.03-10. At room temperature these monomers are crystalline solids for n values close to zero, liquids for n values up to n=0.5, and amorphous solids (glass transition temperature, Tg~40-90° C.) for higher n values.

Another major group of epoxy monomers derived from epichlorohydrin is that comprising monomers synthesized with an aromatic amine, such as methylene dianiline (TG-MDA). Oxirane groups can be generated by peroxidation of carbon-carbon double bonds. Types of such oligomers are epoxidized oils or cycloaliphatic oxides. Epoxy monomers containing vinyl groups, like glycidyl (meth)acrylate or glycidyl oxystyrene, can be used for the synthesis of functional oligomers. Linear or crosslinked epoxy polymers are obtained by reaction of the epoxy monomers with co-monomers ("hardeners") and/or initiators. Epoxy polymers can be produced by step or chain polymerizations or, eventually, by a combination of both mechanisms. Step-growth polymerization proceeds via a step-by-step succession of elementary reactions between reactive sites. Each independent step causes the disappearance of two co-reacting sites and creates a new covalent bond between a pair of functional groups. The number of reactive sites per monomer (functionality) and the molar ratio between co-reactive sites are the main parameters that control the polymer structure.

To obtain linear polymers, the reactants must be bifunctional; monofunctional reactants interrupt the polymer growth. A condition to obtain crosslinked polymers is that at least one of the monomers has a functionality higher than 2. The molar mass of the product grows gradually and the polydispersity tends to 2 for a linear polymer; for a crosslinked polymer the mass-average molar mass becomes infinite at a critical conversion (gelation).

Chain-growth polymerization is characterized by the presence of initiation, propagation, chain transfer and termination steps. In the case of epoxies, the initiation step produces an ion (either an anion or a cation) that is called the active center of the polymerization. The ion may be generated by a chemical reaction or by an adequate source of irradiation. Once active centers are generated they produce primary chains by the consecutive addition of monomers through the propagation step of the reaction. As active centers are always present at the end of primary chains, the propagation reaction continues until it becomes interrupted by a chain transfer step or a termination step. The main parameters controlling the polymer structure are the functionality of monomers, the molar ratio between initiator and monomers, the concentration of species that are involved in chain transfer steps, and temperature (thermal cycle) that affects the relative rates of different steps.

In a preferred embodiment, the epoxy functionality of component C is glycidyl (meth)acrylate, or GMA. The GMA monomer can react with an extremely wide range of monomers and functionalized molecules, providing greater flexibility and freedom in polymer design, as well as performance benefits in the resulting thermoplastic formulation. GMA functional polymers comprise at least one unit derived from glycidyl ester monomer(s). The glycidyl ester polymer may be a polymer, copolymer, or terpolymer. A glycidyl ester monomer means a glycidyl ester of α,β-unsaturated carboxylic acid such as, e.g., acrylic acid, methacrylic acid, itaconic acid, and includes, e.g., glycidyl acrylate, glycidyl methacrylate, glycidyl itaconate. Glycidyl ester polymers include the glycidyl esters (co)polymer described in U.S.

Pat. No. 5,981,661. Suitable glycidyl ester copolymers may be made by conventional free radical initiated copolymerization.

Preferred graft bases for use in Component C, corresponding to the disclosure above with regard to B.2, include composite rubbers of from 1 to 30 wt. %, particularly preferably from 10 to 20 wt. %, silicone rubber and from 99 to 70 wt. %, particularly preferably from 90 to 80 wt. %, butyl acrylate rubber (the indicated wt. % is here based in each case on the total weight of the graft base).

As discussed above, monomer B.1 of Component B comprises vinyl, or acrylic. These monomers may react with the functional shell polymer of Component C to form covalent bonds. By limiting the amount of impact modifiers with a functional shell polymer, the resulting agglomerations, as discussed below, are found to have more free internal space and less covalent bonding, making them less dense, or "loose."

The microstructure of a thermoplastic composition is also highly dependent on the processing conditions. There is a growing interest for components called "core/shell" modifiers, which are small particles of crosslinked rubber phase surrounded by a compatibilizing shell. Core/shell modifiers have a fixed particle size and are often used as impact modifiers.

Core-shell elastomers are designed specifically to produce blends with good dispersion and toughness. The chemical composition and crosslink density of the elastic core determine the cavitation resistance of the particle whereas the composition of the shell is chosen to provide rigidity to the particles during processing and to impart compatibility with the matrix for good dispersion and adhesion. Toughening of thermoplastic using a core-shell impact modifier with a poly(butyl acrylate) (PBA) core and a polymethylmethacrylate (PMMA) shell has been reported before. The PMMA shell of the modifier is miscible with PC. Impact modifiers with varying particle size are used and their effect on impact strength is reported. The influence of rubber phase content and the incorporation of dual-sized particles are also presented.

Component C comprises about 60 to about 95 wt. % core, preferably 70 to about 90 wt. % core, with the remaining amount in Component C being the shell. The glass transition temperature of Component C is preferably −40° C. or less, most preferably −50° C. or less.

Component C may comprise about 1 wt. % to about 10 wt. % of the thermoplastic composition, preferably about 2 wt. % to about 7.5 wt. % of the composition, wherein the wt. %, all instances, is based on total composition weight.

Component D

Optionally, the thermoplastic composition may include component D, a vinyl (co)polymer. Suitable as the vinyl (co)polymers include polymers of at least one monomer selected from the group of the vinyl aromatic compounds, vinyl cyanides (unsaturated nitriles), (meth)acrylic acid ($C_1$-$C_8$)-alkyl esters, unsaturated carboxylic acids as well as derivatives (such as anhydrides and imides) of unsaturated carboxylic acids. Particularly suitable are (co)polymers of: D.1 from 50 to 99 parts by weight, preferably from 60 to 80 parts by weight, in particular from 72 to 78 parts by weight (based on component D) of vinyl aromatic compounds and/or vinyl aromatic compounds substituted on the ring, such as styrene, α-methylstyrene, p-methylstyrene, p-chlorostyrene, and/or (meth)acrylic acid ($C_1$-$C_8$)-alkyl esters, such as methyl methacrylate, ethyl methacrylate, and D.2 from 1 to 50 parts by weight, preferably from 20 to 40 parts by weight, in particular from 22 to 28 parts by weight (based on component D) of vinyl cyanides (unsaturated nitriles), such as acrylonitrile and methacrylonitrile, and/or (meth)acrylic acid ($C_1$-$C_8$)-alkyl esters, such as methyl methacrylate, n-butyl acrylate, tert-butyl acrylate, and/or unsaturated carboxylic acids, such as maleic acid, and/or derivatives, such as anhydrides and imides, of unsaturated carboxylic acids, for example maleic anhydride and N-phenylmaleimide.

The vinyl (co)polymers D are generally resin-like, thermoplastic and rubber-free. A preferred vinyl copolymer D is also a copolymer of D.1 styrene and D.2 acrylonitrile.

The (co)polymers according to D are known and can be prepared, for example, by radical polymerization, in particular by emulsion, suspension, solution or mass polymerization. The (co)polymers preferably have mean molecular weights Mw of from 15,000 to 200,000.

Component D may be present in the thermoplastic composition in an amount of 0 to 40%, preferably 5 to about 20% of the thermoplastic composition. Factors in choosing component D for use with the thermoplastic composition is (1) improvement in flow performance of the resulting thermoplastic composition, and (2) its miscibility, and its compatibility with the other components of the thermoplastic composition.

Component E

The thermoplastic composition can optionally comprise one or more further commercially available polymer additives such as flame retardants, flame retardant synergists, anti-dripping agents (for example compounds of the substance classes of the fluorinated polyolefins, of the silicones as well as aramid fibers), lubricants and mold release agents (for example pentaerythritol tetrastearate), nucleating agents, stabilizers, antistatic agents (for example conductive blacks, carbon fibers, carbon nanotubes as well as organic antistatic agents such as polyalkylene ethers, alkylsulfonates or polyamide-containing polymers), as well as colorants and pigments, in amounts such that they do not impair the mechanical properties of the composition to the extent that the target property profile (no splintering fracture at −10° C.) is no longer fulfilled.

Present in component E may be flame retardants, preferably phosphorus-containing flame retardants, in particular selected from the groups of the monomeric and oligomeric phosphoric and phosphonic acid esters, phosphonate amines and phosphazenes. Component E may also be a mixture of a plurality of components selected from one or more of these groups to be used as flame retardants. It is also possible to use other, preferably halogen-free phosphorus compounds that are not mentioned specifically here, on their own or in arbitrary combination with other, preferably halogen-free phosphorus compounds. Suitable phosphorus compounds include, for example: tributyl phosphate, triphenyl phosphate, tricresyl phosphate, diphenylcresyl phosphate, diphenyloctyl phosphate, diphenyl-2-ethylcresyl phosphate, tri-(isopropylphenyl) phosphate, resorcinol-bridged di- and oligo-phosphate, and bisphenol A-bridged di- and oligo-phosphate. The use of oligomeric phosphoric acid esters derived from bisphenol A is particularly preferred. Phosphorus compounds that are suitable as flameproofing agents are known (see e.g. EP-A 0 363 608, EP-A 0 640 655) or can be prepared by known methods in an analogous manner (e.g. Ullmanns Enzyklopädie der technischen Chemie, Vol. 18, p. 301 ff 1979; Houben-Weyl, Methoden der organischen Chemie, Vol. 12/1, p. 43; Beilstein Vol. 6, p. 177).

Component E my further contain additional optional additives known to those in the art, such as, for example, antioxidants, UV absorbers, light absorbers, fillers, reinforcing agents, additional impact modifiers, plasticizers, optical brighteners, pigments, dyes, colorants, blowing agents, and combinations of any thereof.

In certain embodiments, a composition may comprise zero wt. % to 5.0 wt. % of Component E, more preferably, 0.02 wt. % to 1.64 wt. %, wherein the wt. %, all instances, is based on total composition weight.

Agglomeration

As noted above, the thermoplastic composition comprises two or more impact modifiers: an impact modifier having functional shell polymer, and an impact modifier having a component capable of reaction with functional shell polymer. When these impact modifiers are incorporated in a thermoplastic molding composition as described herein, the impact modifiers form loose agglomerates within the composition. It is believed that the loose agglomerates are formed through reaction of the function shell polymer. Notably, the spiral flow measurements of thermoplastic formulations with and without the impact modifier having a functional shell polymer indicated that the spiral flow was significantly lower in the formulation having an impact modifier having a functional shell polymer, a discussed in the results below. Also described and shown in the examples below, loose agglomerates of particles are characterized by the grouping of impact modifiers that are connected together via epoxy groups of the functional shell polymer, but in a loose manner that allows for spaces among and in between the particles. The loose manner is achieved through the apparent bonding, and likely reaction, of the impact modifiers through epoxy functionality, and with a combination of impact modifiers where one has a functional shell polymer, while the other does not have a functional shell polymer, but is capable of reaction with it.

Loose agglomerates are ones in which the particles of the impact modifier are viewable at a scale of 0.5 microns per inch as shown in the examples, and are seen aggregating with other particles in a loose manner. Loose agglomerates may further be characterized by the diameter of such agglomerates, along with the free space that exists within that diameter. In contrast, dense agglomerates are ones having relatively little open spaces within them. The formation of agglomerates was found to yield a wide range of free spaces within them. However, the free spaces of agglomerations created from the thermoplastic formulations were measured, and analyzed using statistical models. The diameter is measured according to the longest measurable diameter. The agglomerations that were observed to be dense agglomerates, included formulations having just one impact modifier, that modifier having a functional shell polymer. The agglomerations that were observed to be loose agglomerates, included formulations having two impact modifiers: one having a functional shell polymer, and one not having a functional shell polymer, but capable of reaction with it. The loose agglomerations measured herein range from 0.4 to 4.0 microns. The average diameter is 1.0+/−0.5 micron. The free space, or free openings, of the loose agglomerations were measured to range from 20-60% overall, 75% of the free space measurements in the loose agglomerates were measured between 31 and 50%. It is believed that a significant amount of the agglomerations, namely 50%, should be within the range of 31-60% free space, in order to achieve the benefits outlined below.

Loose agglomerates of the rubber particles have been found to have significant benefits. It leads to the formation of large loose rubber clusters or loose rubber aggregates that will scatter light, giving the resulting thermoplastic formulation a low gloss appearance. It also provides low temperature ductility; as the temperature drops and rubber particles become more brittle and less elastic, the loose agglomerates have been found to provide additional low temperature ductility beyond the ductility through use of any one of the impact modifiers alone.

Molding Compositions

The thermoplastic molding compositions according to the invention can be prepared, for example, by mixing the constituents in a known manner and melt compounding and melt extruding the mixture at temperatures of from 200° C. to 340° C., preferably from 240 to 300° C., in conventional devices such as internal kneaders, extruders and twin-shaft screws.

Mixing of the individual constituents can be carried out, in known manner, either in succession or simultaneously, either at about 20° C. (room temperature) or at a higher temperature.

The present invention also provides a process for the preparation of the molding compositions and the use of the molding compositions in the production of molded parts.

The molding compositions according to the present invention can be used, for example, in the production of molded parts of any kind. These can be produced, for example, by injection molding, extrusion and blow molding processes. A further form of processing is the production of molded parts by deep-drawing from previously produced sheets or films.

Examples of such molded parts include films, profiles, casing parts of any kind, for example for domestic appliances such as juice extractors, coffee makers, mixers; for office equipment such as monitors, flat screens, notebooks, printers, copiers; sheets, tubes, conduits for electrical installations, windows, doors and further profiles for the construction sector (interior fitting and external applications) as well as parts for electronics and electrical engineering, such as switches, plugs and sockets, as well as bodywork and interior components for commercial vehicles, in particular for the automotive sector.

The thermoplastic molding compositions according to the invention can also be used, for example, in the production one or more of the following molded parts or moldings: Parts for the interior finishing of railway vehicles, ships, aircraft, buses and other motor vehicles, casings for electrical devices containing small transformers, casings for devices for disseminating and transmitting information, casings and coverings for medical devices, massage devices and casings therefor, toy vehicles for children, prefabricated wall panels, casings for security devices, heat-insulated transport containers, moldings for sanitary and bathroom fittings, cover grids for ventilator openings, and casings for garden equipment. Other molded parts and/or moldings are also contemplated.

The molding compositions according to the present invention are particularly suitable for the production of automotive interior components and bodywork parts which must withstand the effects of light, heat and optionally weathering.

The non-limiting and non-exhaustive examples that follow are intended to further describe various non-limiting and non-exhaustive embodiments without restricting the scope of the embodiments described in this specification.

EXAMPLES

In the Examples below, the following materials were used:

| Component | |
|---|---|
| Component A | a linear polycarbonate based on bisphenol A having a weight-average molecular weight MW of 25,000 g/mol (determined by GPC) |
| Component B | a graft polymer characterized by core-shell morphology, consisting of about 70 to about 90% core, the remainder being shell, the core comprising about 20 to about 60% silicone rubber and about 40 to about 80% butyl acrylate rubber, prepared by emulsion polymerization, the silicone rubber portion comprises at least 50% organosiloxane; the shell comprises styrene acrylonitrile copolymer |
| Component C | a graft polymer characterized by core-shell morphology, consisting of about 70 to about 90% core, the remainder being shell, the core comprising about 10 to about 20 wt. %, silicone rubber and from about 80 to about 90 wt. %, butyl acrylate rubber, prepared by emulsion polymerization, the silicone rubber portion comprises at least 50% organosiloxane; the shell comprises styrene acrylonitrile copolymer and epoxy functionality, the epoxy functionality being GMA |
| Component D | Styrene/acrylonitrile copolymer having a styrene/acrylonitrile weight ratio of 76:24 wt. % and a mean molecular weight of 100,000 g/mol (measured by GPC in dimethylformamide at 20° C.) |
| Component E1 | UV light stabilizer, commercially available from BASF as Tinuvin 329 |
| Component E2 | release agent pentaerythritol tetrastearate |
| Component E3 | octadecyl-3-(3,5-di-tert.butyl-4-hydroxyphenyl)-propionate, a thermal stabilizer, commercially available from Ciba Specialty Chemicals as Irganox 1076 |
| Component E4 | hydrolytic stabilizer tris(2,4-ditert-butylphenyl) phosphite, commercially available from Ciba Specialty Chemicals as Irganox 168; |

The following thermoplastic compositions were created, as described in Table 1. Unless otherwise indicated, all values in Table 1 are listed in parts by weight. The results of the samples are summarized in Table 2.

TABLE 1

| Component | Core $T_g$ (° C.) | pH | 57 | 58 | 59 | 60 | 61 | 62 | 63 | 64 | 65 |
|---|---|---|---|---|---|---|---|---|---|---|---|
| Component A | | | 70.50 | 70.79 | 68.36 | 72.49 | 68.36 | 73.36 | 70.5 | 68.36 | 73.36 |
| Component B | −58 | 5.7 | 8.5 | 12.6 | 5.0 | 5.0 | 15.0 | 7.4 | 8.5 | 10.0 | 10.0 |
| Component C | −50 | 5.3 | 4.3 | 0.0 | 10.0 | 5.9 | 0.0 | 2.6 | 4.3 | 5.0 | 0.0 |
| Component D | | | 15 | 15 | 15 | 15 | 15 | 15 | 15 | 15 | 15 |
| Component E1 | | | 0.8 | 0.8 | 0.8 | 0.8 | 0.8 | 0.8 | 0.8 | 0.8 | 0.8 |
| Component E2 | | | 0.74 | 0.74 | 0.74 | 0.74 | 0.74 | 0.74 | 0.74 | 0.74 | 0.74 |
| Component E3 | | | 0.02 | 0.02 | 0.02 | 0.02 | 0.02 | 0.02 | 0.02 | 0.02 | 0.02 |
| Component E4 | | | 0.08 | 0.08 | 0.08 | 0.08 | 0.08 | 0.08 | 0.08 | 0.08 | 0.08 |

TABLE 2

| Mechanical Properties | | Test | Units | Sample | | | | | | | | |
|---|---|---|---|---|---|---|---|---|---|---|---|---|
| | | | | 57 | 58 | 59 | 60 | 61 | 62 | 63 | 64 | 65 |
| Notched IZOD impact energy | @ −20° C. | ISO 180/1A (2000) | kJ/m² | 51.0 | 71.5 | 36.1 | 30.1 | 77.3 | 48.9 | 49.6 | 48.5 | 62.6 |
| Break type | @ −20° C. | ISO 180/1A (2000) | | 10 par | 10 par | 10 par | 5 par 1hin 4C | 10 par | 10 par | 10 par | 10 par | 10 par |
| Multi-axial impact total energy | @ −30° C. | ASTM D3763B | J | 50.0 | 57.8 | 50.1 | 55.7 | 53.4 | 50.6 | 59.1 | 53.0 | 60.6 |
| Break type | @ −30° C. | ASTM D3763B | | 5D | 5D | 5B | 5B | 4D 1B | 5D | 4D 1B | 5D | 1D 4B |
| Tensile elongation at break | | ISO 527 | % | 106 | 123 | 97 | 115 | 136 | 111 | 111 | 113 | 118 |
| Gloss | | | | | | | | | | | | |
| Specular gloss at 60° | | ASTM D523 | | 70 | 103 | 54 | 60 | 104 | 86 | 77 | 73 | 104 |
| Processing Properties | | | | | | | | | | | | |
| Spiral flow (0.100") | @ 260° C. | See below | n | 20.3 | 22.3 | 21.5 | 21.3 | 22.9 | 20.8 | 20.8 | 20.4 | 21.6 |
| Spiral flow (0.100") | @ 280° C. | See below | n | 24.8 | 26.9 | 27.8 | 26.3 | 27.5 | 25.0 | 25.0 | 24.8 | 26.3 |

As shown in the examples given above, when the thermoplastic composition comprises both a first impact modifier characterized by core-shell morphology and comprising epoxy functionality, and a second impact modifier comprising a component capable of reaction with epoxy functionality, both the low temperature ductility is improved and the composition had low gloss.

As noted above, the impact strength was measured in accordance with ASTM D3763. This was performed at room temperature and −30 C, using specimens ⅛" inch in thickness. For each sample, five different specimens were tested to determine whether each would experience a ductile (D) or a brittle (B) failure. A ductile failure is one where the specimen deformed plastically before fracturing, and where the specimen is without cracks radiating more than 10 mm beyond the center of the impact point. A brittle failure is one where the specimen test area is broken into two or more pieces, with sharp edges and thus exhibits little plastic flow. The best measurements for low temperature ductility noted in Table 2, was a 5D rating (meaning each of the 5 specimen exhibited ductile failure), which was achieved in only four samples: 57, 58, 62 and 64. Several other samples (59 and 60) achieved a 5B rating, which is not desired.

The gloss, as shown by the specular gloss measurements at 600 is significantly lower in compositions having each of these components as well. Samples 57, 59, 60, 62, 63 and 64 were each shown to have low gloss. Surprisingly, each of these samples were from compositions including both Component B and Component C, while the samples from compositions having just one impact modifier all had higher gloss. Finally, the above samples were each shown to be sufficiently flowable to be used as a molding composition.

Spiral flow is measured using a Roboshot injection molding machine applying the designated molding conditions for mold and melt temperature and measure how far it can push the material. The mold temperature is 80 C, and the melt temperature is indicated in Table 2. The mold is subject to a high pressure of 18,000 psi for 3 seconds, then a hold pressure of 10,000 psi for 6 seconds, and then cooling for 20 seconds at the back pressure of 800 psi. The screw speed is 100 rpm. The injection speed is 4 inches per second. The decompression distance is 0.10 inches. The maximum pack velocity is 0.50 inches per second. The position transfer is 0.10 inches. The shot size is designed to maintain a 0.25 inch cushion. The clamp tonnage equals 110 short tons. The length of the spiral flow is measured in inches.

In addition to the above testing, the agglomerates of several samples were characterized through the use of Atomic Force Microscopy (AFM). The AFM images were obtained in air with a commercial scanning probe microscope (Nanoscope IIIa, Digital Instruments, Santa Barbara, Calif.) operated in the tapping mode. Height and phase images were recorded simultaneously. Measurements were per-formed at ambient conditions using rectangular-type Si probes with spring constants of 50 $Nm^{-1}$ and resonance frequencies in the 284-362 kHz range. The tip radius was 10 nm. The results are discussed below. AFM is powerful technique that can provide direct mapping of surface morphology with nanometer resolution. Further, the phase contrast in tapping mode AFM often reflects differences in the properties of individual components of heterogeneous materials, and is useful for compositional mapping in polymer blends and copolymers, and heterogeneity mapping in polymer coatings. Additionally, AFM requires no specific sample preparation procedure, can be operated in ambient condition and provides information about the sample surface in a relatively nondestructive way, it is very suitable to use this technique to monitor the change of the surface feature of the same sample with the time of the exposure.

In a comparative sample, a thermoplastic formulation was prepared comprising Components A, D and E as described above, and 10 wt. % of Component B, with no Component C. Using AFM at a scale of about 0.5 microns per inch, the particles of Component B are visible in darker color, while Components A and D are visible in a lighter color. The particles of Component B can be seen as a dispersion; the particles do not form agglomerates.

In a sample comprising an inventive composition, a thermoplastic formulation was prepared comprising Components A, D and E as described above, and 10 wt. % of Component B and 5% of Component C. A molded part was made therefrom, under the following conditions: the composition was heated to 280-305° C. for melt temperature, and then was molded at around 80 CC, with the injected speed range from 0.4-1.2 in/sec. Using AFM at a scale of about 0.5 microns per inch, the particles of Components B and C are viewable at this scale in a darker color, with the remainder of the components in a lighter color, and are seen combining into loose agglomerates. A total of 77 agglomerates from 5 images taken from slices of the molded parts were analyzed. The range of diameters measured, according to the longest measurable diameter, was 0.4-4.0 microns. The average diameter was 1.0+/−0.5 microns. The free space, or free openings, of the loose agglomerations were measured to be 20-60% overall, 75% of the free space measurements in the loose agglomerates were measured between 31 and 50%. The median free space was measured to be 36%, and the median 50% of measurements were between 31 and 39%.

In another comparative example, a thermoplastic formulation was prepared using Components A, D and E as described above, and 10% of Component C, and no Component B. Using AFM at a scale of about 0.5 microns per inch, the particles of Components C were observed to form dense agglomerates, and the individual impact modifier particles can no longer be seen. It is believed that the epoxy functionality has worked to tightly bond the particles with each other to form such masses. The range in size of the tight agglomerates was 0.6-3.6 micron, with an average of 1.5+/−0.7 microns. The free space of the dense agglomerates was measured to be 0-39%, with 75% of the measurements between 0 and 26%. The median free space was measured to be 22.5%, with the median 50% of measurements between 13.8% and 26%.

Aspects of the thermoplastic compositions disclosed herein include:
A thermoplastic composition comprising:
A) a thermoplastic resin;
B) an impact modifier capable of reaction with a functional shell polymer, that does not comprise a functional shell polymer; and
C) an impact modifier characterized by core-shell morphology and comprising a functional shell polymer.
A thermoplastic composition comprising:
  a thermoplastic resin; and
  loose agglomerations of particles;
    wherein at least 50% of the loose agglomerations comprise open spaces that measure 31 to 60% by area of the loose agglomeration, and wherein the loose agglomerations of particles comprise particles characterized by core-shell morphology.
Any of the thermoplastic compositions disclosed herein, wherein the thermoplastic resin comprises a polyester selected from the group consisting of polycarbonate, polyethylene terephthalate and polybutylene terephthalate.

Any of the thermoplastic compositions disclosed herein, wherein the thermoplastic resin comprises about 40 to about 90 wt. % of the composition, preferably about 60 to about 80 wt. %, most preferably about 65 to about 75 wt. %.

Any of the thermoplastic compositions disclosed herein, wherein the loose agglomerations comprise Component B: an impact modifier and Component C: a second impact modifier.

Any of the thermoplastic compositions disclosed herein, wherein Component B is characterized by core-shell morphology.

Any of the thermoplastic compositions disclosed herein, wherein Component B or Component C comprises a core that does not include carbon-carbon double-bonds.

Any of the thermoplastic compositions disclosed herein, wherein Component B comprises a siloxane.

Any of the thermoplastic compositions disclosed herein, wherein Component B comprises a graft base, that comprises 10 to 70 wt. %, particularly preferably from 20 to 60 wt. %, silicone rubber.

Any of the thermoplastic compositions disclosed herein, wherein Component B comprises acrylic.

Any of the thermoplastic compositions disclosed herein, wherein Component B comprises an impact modifier capable of reaction with epoxy functionality, that does not comprise epoxy functionality.

Any of the thermoplastic compositions disclosed herein, wherein Component B or Component C comprises acrylate.

Any of the thermoplastic compositions disclosed herein, wherein Component B or Component C comprises methyl methacrylate.

Any of the thermoplastic compositions disclosed herein, wherein the functional shell polymer of Component C is epoxy functionality.

Any of the thermoplastic compositions disclosed herein, wherein the epoxy functionality of Component C is glycidyl (meth)acrylate.

Any of the thermoplastic compositions disclosed herein, wherein Component B or Component C has a glass transition temperature of −40° C. or less, preferably −50° C. or less.

Any of the thermoplastic compositions disclosed herein, wherein Component B or Component C comprises about 60 to about 95 wt. % core, preferably about 70 to about 80 wt. % core, as a percentage of the total weight of the impact modifier's core and shell.

Any of the thermoplastic compositions disclosed herein, wherein Component B is present in the composition in an amount of about 5 to about 20 wt. %, preferably about 7.5 to about 15 wt. %.

Any of the thermoplastic compositions disclosed herein, wherein Component C is present in the composition in an amount of about 1 to about 10 wt. %, preferably 2 to about 7.5 wt. %.

Any of the thermoplastic compositions disclosed herein, further comprising Component D: a vinyl (co)polymer.

Any of the thermoplastic compositions disclosed herein, wherein the vinyl (co)polymer is styrene acrylonitrile.

Any of the thermoplastic compositions disclosed herein, wherein Component D comprises about 5 to about 20 wt. % of the thermoplastic composition.

Any of the thermoplastic compositions disclosed herein, further comprising Component E: at least one additive selected from group consisting of: flame retardants, flame retarding synergists, anti-dripping agents, antioxidants, UV absorbers, light absorbers, fillers, reinforcing agents, additional impact modifiers, lubricants, plasticizers, optical brighteners, pigments, dyes, colorants, anti-static agents, mold-release agents, blowing agents, and combinations of any thereof.

Any of the thermoplastic compositions disclosed herein, wherein Component E comprises about 0.02 to about 1.64 wt. % of the thermoplastic composition.

Any of the thermoplastic compositions disclosed herein, wherein Component B and Component C form loose agglomerations of particles, wherein at least 50% of the loose agglomerations comprise open spaces that measure 31 to 60% by area of the loose agglomeration.

Any of the thermoplastic compositions disclosed herein, wherein the loose agglomerations comprise particles having a diameter between 0.4 and 4.0 microns.

A molded part comprising any of the thermoplastic compositions disclosed herein.

A process for producing a molded part comprising any of the thermoplastic compositions disclosed herein, the process comprising at least one of an injection molding, an extrusion and a blow molding process.

A molded part comprising a thermoplastic resin and loose agglomerations of particles, wherein at least 50% of the loose agglomerations comprise open spaces that measure 31 to 60% by area of the loose agglomeration, and wherein the loose agglomerations of particles comprise particles characterized by core-shell morphology.

A process for producing a molded part having a thermoplastic resin and loose agglomerations of particles, wherein at least 50% of the loose agglomerations comprise open spaces that measure 31 to 60% by area of the loose agglomeration, and wherein the loose agglomerations of particles comprise particles characterized by core-shell morphology, the process comprising at least one of an injection molding, an extrusion and a blow molding process.

In addition, the following thermoplastic molding compositions are disclosed:

40-90% thermoplastic resin,
5-20% Component B,
1-10% Component C,
5-20% Component D, and
0.02-1.64% Component E.

40-90% thermoplastic resin,
7.5-15% Component B,
1-10% Component C,
5-20% Component D, and
0.02-1.64% Component E.

40-90% thermoplastic resin,
5-20% Component B,
2-7.5% Component C,
5-20% Component D, and
0.02-1.64% Component E.

40-90% thermoplastic resin,
7.5-15% Component B,
2-7.5% Component C,
5-20% Component D, and
0.02-1.64% Component E.

60-80% thermoplastic resin,
5-20% Component B,
1-10% Component C,
5-20% Component D, and
0.02-1.64% Component E.

60-80% thermoplastic resin,
7.5-15% Component B,
1-10% Component C,
5-20% Component D, and
0.02-1.64% Component E.

60-80% thermoplastic resin,
5-20% Component B,
2-7.5% Component C,
5-20% Component D, and
0.02-1.64% Component E.
60-80% thermoplastic resin,
7.5-15% Component B,
2-7.5% Component C,
5-20% Component D, and
0.02-1.64% Component E.
65-75% thermoplastic resin,
5-20% Component B,
1-10% Component C,
5-20% Component D, and
0.02-1.64% Component E.
65-75% thermoplastic resin,
7.5-15% Component B,
1-10% Component C,
5-20% Component D, and
0.02-1.64% Component E.
65-75% thermoplastic resin,
5-20% Component B,
2-7.5% Component C,
5-20% Component D, and
0.02-1.64% Component E.
65-75% thermoplastic resin,
7.5-15% Component B,
2-7.5% Component C,
5-20% Component D, and
0.02-1.64% Component E.

What is claimed is:

1. A thermoplastic composition comprising:
   A) a thermoplastic resin;
   B) an impact modifier capable of reaction with a functional shell polymer, that does not comprise a functional shell polymer; and
   C) an impact modifier characterized by core-shell morphology and comprising a functional shell polymer,
   wherein Component B and Component C form agglomerations of particles, wherein at least 50% of the agglomerations comprise open spaces that measure 31 to 60% by area of the agglomeration.

2. The thermoplastic composition of claim 1, wherein Component B comprises a siloxane.

3. The thermoplastic composition of claim 1, wherein Component B comprises acrylic.

4. The thermoplastic composition of claim 1, wherein Component B comprises an impact modifier capable of reaction with epoxy functionality that does not comprise epoxy functionality.

5. The thermoplastic composition of claim 1, wherein Component B or Component C comprises acrylate.

6. The thermoplastic composition of claim 1, wherein the functional shell polymer of Component C is epoxy functionality.

7. The thermoplastic composition of claim 6, wherein the epoxy functionality of Component C is glycidyl (meth) acrylate.

8. The thermoplastic composition of claim 1, wherein the agglomerations comprise particles having a diameter between 0.4 and 4.0 microns.

9. A molded part comprising the thermoplastic composition of claim 1.

10. A thermoplastic composition comprising:
    a thermoplastic resin; and
    agglomerations of particles;
    wherein at least 50% of the agglomerations comprise open spaces that measure 31 to 60% by area of the loose agglomeration,
    and wherein the agglomerations of particles comprise particles characterized by core-shell morphology.

11. The thermoplastic composition of claim 10, wherein the agglomerations comprise Component B: an impact modifier and Component C: a second impact modifier.

12. The thermoplastic composition of claim 11, wherein Component B does not comprise a functional shell polymer.

13. The thermoplastic composition of claim 11, wherein Component C comprises a functional shell polymer.

14. The thermoplastic composition of claim 11, wherein Component B is characterized by core-shell morphology.

15. The thermoplastic composition of claim 11, wherein Component B comprises an impact modifier capable of reaction with epoxy functionality that does not comprise epoxy functionality.

16. The thermoplastic composition of claim 11, wherein Component B or Component C comprises acrylate rubber.

17. The thermoplastic composition of claim 11, wherein the functional shell polymer of Component C is epoxy functionality.

18. The thermoplastic composition of claim 11, wherein the epoxy functionality of Component C is glycidyl (meth) acrylate.

19. The thermoplastic composition of claim 10, wherein the agglomerations comprises particles having a diameter between 0.4 and 4.0 microns.

20. A molded part comprising:
    a thermoplastic resin; and
    agglomerations of particles;
    wherein at least 50% of the agglomerations comprise open spaces that measure 31 to 60% by area of the agglomeration,
    and wherein the agglomerations of particles comprise particles characterized by core-shell morphology.

* * * * *